Oct. 8, 1968 K. H. MOCK 3,404,727
ROTARY REGENERATIVE HEAT EXCHANGERS
Filed Oct. 26, 1966
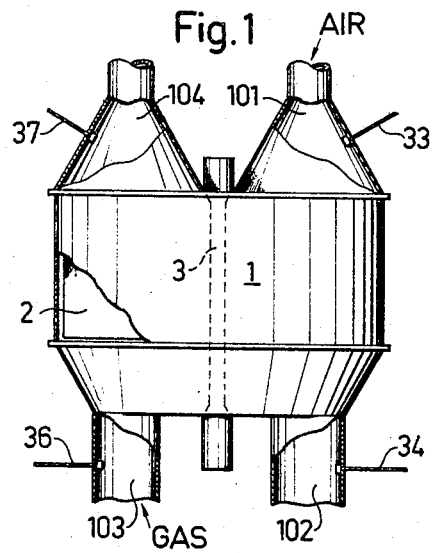
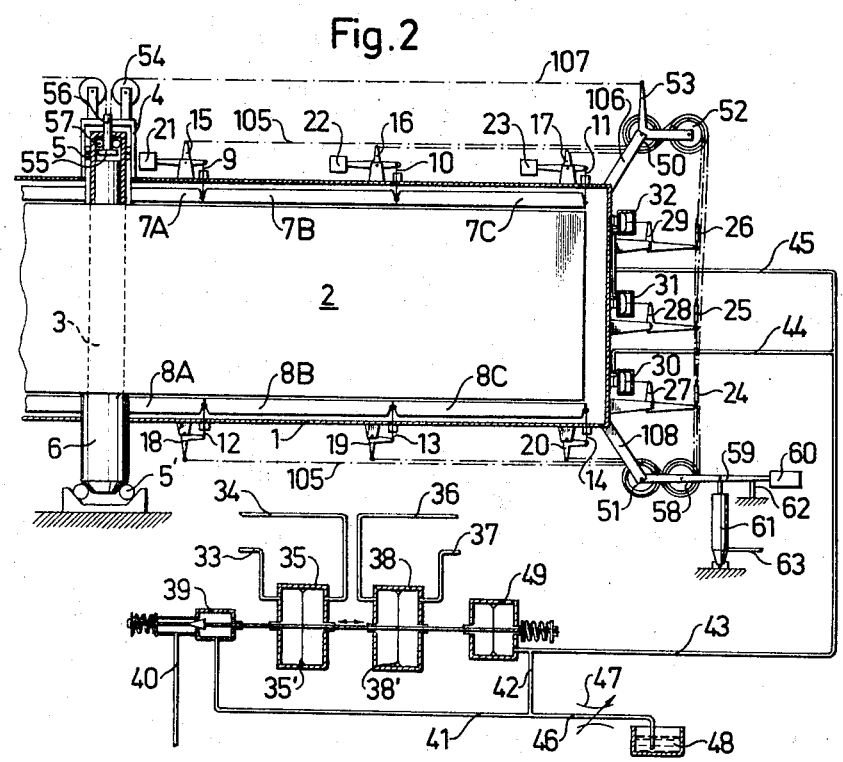
INVENTOR
Karl Heinz Mock
BY Jarvis C. Marble
ATTORNEY United States Patent Office 3,404,727
Patented Oct. 8, 1968

3,404,727
ROTARY REGENERATIVE HEAT EXCHANGERS
Karl Heinz Mock, Neckargemund, Germany, assignor to Svenska Rotor Maskiner Aktiebolag, Nacka, Sweden, a corporation of Sweden
Filed Oct. 26, 1966, Ser. No. 589,672
8 Claims. (Cl. 165—9)

ABSTRACT OF THE DISCLOSURE

Apparatus for use with rotary regenerative air preheaters which provides for a counter-balance suspension system for the sector plates disposed between the adjacent rotating and non-rotating end surfaces of the regenerative mass and the inlet and outlet ducts at each end thereof and which includes a pulley system interconnecting the upper and lower axially aligned plates of the preheater so that movement of the upper plate in response to thermal deformation of the regenerative mass results in a corresponding movement of the respective lower plate. Also, the suspension system includes a pressure responsive sensing device which senses variation in pressure in the inlet and outlet ducts of the apparatus between the heat emitting media and the heat absorbing media for counteracting the effect of this pressure differential on the sector plates to prevent movement thereof in response to such sudden pressure changes.

The invention relates to rotary regenerative heat exchangers such as air preheaters. The invention is applicable to heat exchangers having a rotatable regenerative mass and stationary ducts for the heat exchanging media as well as to heat exchangers having a stationary heat retaining mass and rotatable ducts.

Since the pressures of the two heat exchanging media are different it is necessary to provide sealing means between the mouths of the ducts and the end surfaces of the regenerative mass. Normally the sealing means comprise sector shaped plates which are provided at the transition zones between the flue gas duct and the air duct. The sector plates may be movable so that they under all operating conditions can be moved close to the end surfaces of the regenerative mass in spite of the fact that this mass undergoes thermal deformation. The gap between the rotating and stationary portions of the heat exchanger through which the medium of the higher pressure (air) can enter the duct for the other medium can be kept small. This holds true also for the axial sealing means cooperating with the cylindrical outer wall of the regenerative mass.

There have been suggested several solutions of the sealing problem. A sliding contact between the sector plates and corresponding surfaces of the regenerative mass results in noise and wear and a great driving power. Therefore, in practice there is usually a gap which under all operating conditions has to be kept as small as possible while obviating the risk of sliding contact or jamming. However, it is very difficult to maintain such a narrow gap because due regard must be paid to the thermal deformation of cooperating parts, particularly the deformation of the large regenerative mass, and also to the forces which are exerted upon the movable sector plates and emanate from the different pressures of the media. These forces are not constant but vary in dependence on variations of the load of the boiler plant and they are also influenced by deposits on the surface of the heat exchanging material.

The heat exchanger according to the invention is characterized by control elements which in dependence on the pressures in the gas and air ducts immediately upstream and downstream of the regenerator mass actuate the sector plates such that the forces acting upon the sector plates and emanating from the pressure differences are at least partly counter-balanced.

In this manner there is provided a compensating device which continuously adapts the counter-balancing force to the varying operating conditions. Such a device can be used in combination with known adjustment means and simplifies the supervision of the plant.

The invention will now be described more in detail with reference to the accompanying drawing which illustrates an embodiment thereof.

FIG. 1 is a diagrammatic side elevation of an air preheater having a rotatable regenerative mass and stationary ducts for the heat exchanging media while FIG. 2 is a sectional view on a larger scale of a part of a preheater according to FIG. 1.

Referring to FIG. 1 numeral 1 indicates the housing of an air preheater in which is rotatably mounted a rotor 2 containing the regenerative mass. The air to be heated is supplied through a stationary duct 101 and the hot air is discharged through the stationary duct 102 at the bottom of the preheater. Flue gases used as heating medium is supplied from below through a stationary duct 103 and is discharged in a cooled state through a stationary duct 104. Accordingly the upper end of the air preheater is the cold end.

As more clearly shown in FIG. 2 the upper end of the rotor post or shaft 3 is journalled in a radial bearing 5 provided in a casing 4 which is secured to the housing 1. The lower end 6 of the rotor post 3 rests in a combined thrust and radial bearing 5' of antifriction type.

The rotor 2 is in known manner subdivided into a plurality of sectorial compartments and in order to prevent mingling of the two fluid flows there are provided sector plates 7 and 8 at the end surfaces of the rotor. As shown in FIG. 2 the upper sector plate 7 is composed of a central section 7A, a middle section 7B and an outer section 7C, the sections being pivotally connected to each other. The lower sector plate 8 is correspondingly composed of sections 8A, 8B and 8C.

The upper end wall of the housing 1 carries three three-armed levers 15, 16, 17, each comprising two oppositely directed horizontal arms and a vertical arm perpendicular thereto. One of the horizontal arms of the radially innermost lever 15 is connected to the pivot axis between plate sections 7A and 7B by means of a link 9 while the other horizontal arm carries a counter-weight 21. To the vertical third arm is attached one end of a wire 105.

The lower end wall of the housing 1 carries three bell cranks 18, 19, 20. One bell crank arm is horizontal and the other vertical. The horizontal arm of the radial innermost bell crank 18 is connected to the pivot axis between the plate sections 8A and 8B by means of a link 12 while the vertical arm is connected to the other end of the wire 105 which in a manner to be described later on in this specification passes via a pulley system from one side of the housing to the other.

In similar manner the three-armed lever 16 is connected to the pivot shaft between plate sections 7B and 7C by means of a link 10 and carries a counter-weight 22 while the third arm is connected to a wire (not indicated by reference numeral) the other end of which is connected to one arm of the bell crank 19. The other arm of the bell crank 19 is connected to the pivot shaft between plate sections 8B and 8C by a link 13.

The radially outermost three-armed lever 17 is connected to the free end of plate section 7C by a link 11 and carries a counter-weight 23 while its third arm is connected to one end of a wire, the other end of which is connected to one arm of bell crank 20. The other arm of said bell crank is connected to the outer end of plate section 8C by a link 14.

From FIG. 2 it is evident that the levers 15, 16, 17 and the bell cranks 18, 19, 20 are interconnected such by means of the wires that an upward movement of any of the sector plate sections 7A, 7B, 7C will cause a corresponding upward movement of the corresponding sector plate section 8A, 8B or 8C.

From the lever 15 the wire 105 extends radially outwardly to a pair of pulleys 50 and 52. The pulley 50 is rotatable on a shaft carried by a stationary bracket 106 while the pulley 52 is carried by one arm of a bell crank 53 pivotable on the shaft of the pulley 50. The other arm of the bell crank 53 is connected to one end of a wire 107 the other end of which is connected to a member 56 which extends into the interior of the hollow upper end of the rotor post 3 where it is provided with a disk 55. The tension of the wire 107 biases the disk 55 upwardly towards a thrust bearing 57. The arrangement is such that the member 56 follows the axial movements of the upper end of the rotor post 3 but does not take part in the rotation thereof.

From the pulley 52 the wire 105 passes vertically downwardly to a pair of pulleys 51 and 58. The pulley 51 is rotatable on a shaft carried by a stationary bracket 108 while the pulley 58 is carried by a lever 59 pivotable on the shaft of the pulley 51. The lever 59 carries a weight 60 which normally keeps the lever 59 in contact with a stationary abutment element 62.

Pulleys corresponding to pulleys 50, 52, 51, 58 are provided also for the two wires connecting levers 16 and 17 with bell cranks 19 and 20, respectively.

Between the pulleys 52 and 58 the wire 105 and the other two corresponding wires are provided with stretching screws 24, 25, 26 by means of which the length of the wires can be adjusted such that the distance between corresponding sector plate sections on either side of the rotor and thereby the clearances between the sector plates and the end surfaces of the rotor will have the desired value. This adjustment can be made when the apparatus is cold. When the rotor is heated it assumes a dished configuration which is a well known phenomenon. Due to the hinge connections between the sector plate sections the sector plates adapt themselves to this dished form. However, the rotor is also subjected to axial expansion which tends to reduce the width of the clearances between the sector plates and the rotor. When the rotor post 3 expands thermally its upper end moves upwardly and the wire 107 which is guided by the pulley 54 moves such that the bell crank 53 turns clockwise. Thereby the distance between the pulleys 52 and 58 is reduced so that the upper sector plate 7 is moved upwardly in correspondence to the increase of the rotor height.

The peripheral wall of the housing 1 carries three bell cranks 27, 28, 29. The horizontal arm of each bell crank is connected to one of the wires 105 while the vertical arm is connected to the piston rod of a hydraulic loading means 30, 31 and 32, respectively.

The weight of the sector plates 7 and 8 is counterbalanced by the counter-weights 21, 22, 23. During operation the air is supplied to the air preheater by a fan so that the pressure of the air is higher than that of the gas. In the air preheater shown it is assumed that the spaces between the sector plates and the end walls of the housing 1 are in communication with the gas side of the preheater. Therefore, each sector plate is subjected to a force which is proportional to the difference in pressure of the air and the gas acting upon either side thereof. Since this pressure difference is greater at the cold end of the preheater than at the hot end thereof the lifting force acting upon the upper sector plate 7 overcomes the downwardly directed force acting upon the lower sector plate 8. However, an upward movement of the sector plate 7 would result in an increased clearance between said plate and the rotor end surface while the lower sector plate 8 would be pressed into sliding contact with the lower end surface of the rotor. Therefore such movements must be prevented.

In FIG. 2. there is diagrammatically shown a control device comprising two coaxial cylinders 35 and 38, each containing a diaphragm or piston 35' and 38', respectively. These two pistons are carried by a common piston rod one end of which extends into a valve device 39 and is operatively connected to the valve member of this device. Pressure oil is supplied to the valve device 39 through a conduit 40.

In the cylinder 35 the chamber to the left of the piston 35' is connected through a conduit 33 with a pressure tap hole provided in the air supply duct 101 while the chamber to the right of the piston 35' is connected through a conduit 34 with a pressure tap hole in the air discharge duct 102. In a similar manner the two chambers of the cylinder 38 are connected to pressure tap holes provided in the gas supply duct 103 and the gas discharge duct 104 through conduits 36 and 37, respectively.

The valve device 39 is adapted to control the supply of pressure oil to and thereby the oil pressure in a pressure oil system comprising conduits 41, 42 and 43 provided with an exhaust pipe 46 leading to an oil sump 48 via an adjustable relief valve 47. The pressure oil system is connected to the cylinders of the hydraulic loading devices 30, 31, 32.

According to the explanations given above an increase of the pressure of the air and the gas in the supply ducts 101 and 103, respectively, will result in an increase of the lifting force acting upon the upper sector plate 7. The same result will be obtained at a decrease of the pressure in the discharge ducts 102 and 104, respectively.

During operation the pressure in the pressure oil system is controlled by the control device such that the downwardly directed forces produced by the loading cylinders 30, 31, 32 and acting upon the wires 105 are in each moment sufficient to resist the lifting force acting upon the sector plates and substantially equal that force. Thus, for instance, upon an increase of the air pressure in the supply duct 101 the diaphragm or piston 35' moves the valve body 39 to the right thereby increasing the area for the pressure oil supplied through the conduit 40. This results in an increase of the pressure in the pressure oil system 41, 42, 43 so that the increased lifting force is substantially counter-balanced by the increased forces of the loading cylinders 30, 31, 32. The level of the pressure in the pressure oil system may be preadjusted by means of the relief valve 47.

The rod connecting the control pistons 35' and 38' with the valve body of the control valve 39 also carries a diaphragm or piston provided in a cylinder 49 and actuated by the pressure in the pressure oil system 41, 42, 43. This last mentioned piston counteracts opening movements of the control valve 39 and limits such movements.

From the above it is evident that fluctuations of the pressures in the ducts 101, 102, 103, 104 cannot cause any movements of the bell cranks 27, 28 and 29 since such fluctuations are accompanied by fluctuations of the pressure in the pressure oil system such that the forces from the loading devices 30, 31, 32 always substantially exactly equals the lifting force acting upon the sector plates. However, during the starting period the rotor undergoes a thermal deformation and adopts a dish-like form so that its upper end surface becomes concave. This involves that for instance the outer end of the sector plate section 7C is pressed upwardly by the outer periphery of the rotor. Due to this action the corresponding bell crank 27, 28 or 29 is biased counter-clockwise and presses its piston inwardly in its cylinder. Also the other two plate sections 7A and 7B are actuated in the same manner but to a smaller degree so that all loading devices 30, 31 and 32 tend to increase the pressure in the pressure oil system. However, oil is continuously discharged from the pressure oil system through the relief valve 47 and even a slight pressure increase will cause the piston in the cylinder 49 to move the valve body of the control valve 39 a small distance in closing direction. Therefore oil can be displaced from the loading devices and discharged from the pressure oil system through the relief valve 47. It is to be noted that this decrease of the oil volume of the pressure oil system need not take place abruptly but successively since the rotor deforms rather slowly.

It is evident that the movements of the sector plates due to the deformation of the rotor do not influence the forces counter-balancing the lifting force acting upon the sector plates and emanating from the air and gas pressures.

The lever 59 carrying the pulley 58 is operable by means of a hydraulic or pneumatic jack 61. In case of disturbances the lever 59 can be swung counter-clockwise by supplying pressure fluid to the jack through the conduit 63. Thereby the wires 105 are slackened and the sector plates are immediately separated. The supply of pressure fluid to the jack 61 may be controlled manually or automatically for instance in dependence on the power necessary to drive the rotor.

The rotors of rotary regenerative heat exchangers are often driven by hydraulic motors. In such case the working fluid of the drive system may be utilized in the pressure oil system of the device according to the invention.

Even though the embodiment shown and described is a preferred one it is to be understood that the pressure variations in the ducts 101, 102, 103 and 104 may be transformed into the desired force variations in several different ways, for instance by means of a combination of mechanical and electric devices.

As mentioned above the invention is also applicable to heat exchangers of the type having an annular stationary regenerative mass and rotatable ducts. In such a heat exchanger the wires 105 may pass through a central tube interconnecting the rotatable ducts. All elements of the control system according to the invention can be mounted on the rotatable ducts and within the tube connecting them and the necessary pressure oil may be supplied to a central conduit comprising a swivel joint.

The invention is applicable to all heat exchangers having so called floating sector plates irrespective of the number of plate sections.

What I claim is:

1. Rotary regenerative heat exchanger for preheating of air by means of flue gases and having movable sector plates covering inactive portions of the regenerative mass, characterized by pressure sensing control elements for sensing the pressure in the gas and air ducts immediately upstream and downstream of the mass and connected to said sector plates, and including pressure responsive means disposed between said control elements and said sector plates which in dependence on the pressures in the gas and air ducts immediately upstream and downstream of the regenerator mass actuate the sector plates such that the forces acting upon the sector plates and emanating from the pressure differences are at least partly counter-balanced.

2. An air preheater as defined in claim 1, wherein said pressure responsive means includes double-acting piston means for sensing the pressure differences, said piston means being connected to a valve controlling the pressure of a pressure fluid used for producing a force acting upon the movable sector plates.

3. An air preheater as defined in claim 2, wherein the sector plates are mechanically connected to the piston rods of a single-acting piston means operated by said pressure fluid.

4. An air preheater as defined in claim 1 in which axially aligned sector plates are coupled to each other and wherein this coupling is effected by wires to which are attached means producing the counter-balancing force and governed in accordance with said pressure differences.

5. An air preheater as defined in claim 4 in which sets of pulleys are provided for guiding the wires interconnecting the sector plates at one end of the regenerative mass and those at the other end thereof and wherein one pulley in each set is adjustable such as to slacken the appertaining wire to permit separating of the interconnected sector plates.

6. An air preheater as defined in claim 5 wherein there is provided a pressure-fluid operated servo-motor adapted to automatically move said adjustable pulley in wire slackening direction upon exceeding a predetermined limit load.

7. An air preheater as defined in claim 2 which is driven by a hydraulic motor and wherein the hydraulic working fluid of this motor is utilized also as pressure fluid in the devices controlling the counter-balancing force.

8. An air preheater as defined in claim 4 comprising sets of pulleys for guiding the wires and wherein the position of one of the pulleys in each set is adjustable in dependence on the variation of the height of the regenerative mass to adapt the distance between interconnected sector plates to such variations.

References Cited
UNITED STATES PATENTS

| 2,705,615 | 4/1955 | Rigby | 165—7 |
|-----------|--------|-------|-------|
| 3,232,335 | 2/1966 | Kalbfleisch | 165—9 |
| 3,250,316 | 5/1966 | Nyberg | 165—9 |

ROBERT A. O'LEARY, *Primary Examiner.*

A. W. DAVIS, *Assistant Examiner.*